United States Patent [19]
Gattuso

[11] Patent Number: 5,160,432
[45] Date of Patent: Nov. 3, 1992

[54] OIL CONTAINMENT BOOM AND SKIMMER

[76] Inventor: Peter Gattuso, 41-99 Parsons Blvd., Flushing, N.Y. 11355

[21] Appl. No.: 695,318

[22] Filed: May 3, 1991

[51] Int. Cl.⁵ .............................. E02D 15/10
[52] U.S. Cl. ................... 210/242.3; 210/257.1; 210/923; 405/63
[58] Field of Search ............... 405/63, 66; 210/242.3, 210/257.1, 923

[56] References Cited

U.S. PATENT DOCUMENTS

| | | | |
|---|---|---|---|
| 3,221,884 | 12/1965 | Muller | 210/923 X |
| 3,369,664 | 2/1968 | Dohan | 210/923 X |
| 3,503,508 | 3/1970 | Desty et al. | 210/242.3 X |
| 3,534,859 | 10/1970 | Amaro et al. | 210/923 X |
| 4,024,063 | 5/1977 | Mori | 210/923 X |
| 4,146,482 | 3/1979 | Shyu | 210/242.3 |
| 4,310,415 | 1/1982 | Webb | 210/242.3 |
| 4,388,188 | 6/1983 | Morris | 210/242.3 |
| 4,818,399 | 4/1989 | Midkiff | 210/242.3 |
| 4,988,438 | 1/1991 | Eddleman | 405/66 X |
| 5,000,616 | 3/1991 | Bell et al. | 405/66 |
| 5,071,545 | 12/1991 | Ashtray | 405/63 X |

FOREIGN PATENT DOCUMENTS 2393113  2/1979  France .................. 210/242.3

*Primary Examiner*—Dennis L. Taylor
*Assistant Examiner*—Arlen L. Olsen
*Attorney, Agent, or Firm*—Collard & Roe

[57] ABSTRACT

An oil containment boom and skimmer for extending at least partially about, containing against further dispersion, and skimming an oil spill from a body of water. A first longitudinally extending tubular member is placed adjacent to the oil spill area. It includes an inner open area and inlet means for receiving oil and water. A second longitudinally extending tubular member is placed parallel to the first member. The second member includes an inner open area which is in communication with the first inner open area. A passageway with a lip connects the members and is placed slightly above sea level for skimming the upper layer of oil. The second open area contains ports which allow the oil to drain out into a separate oil storage tank.

12 Claims, 2 Drawing Sheets

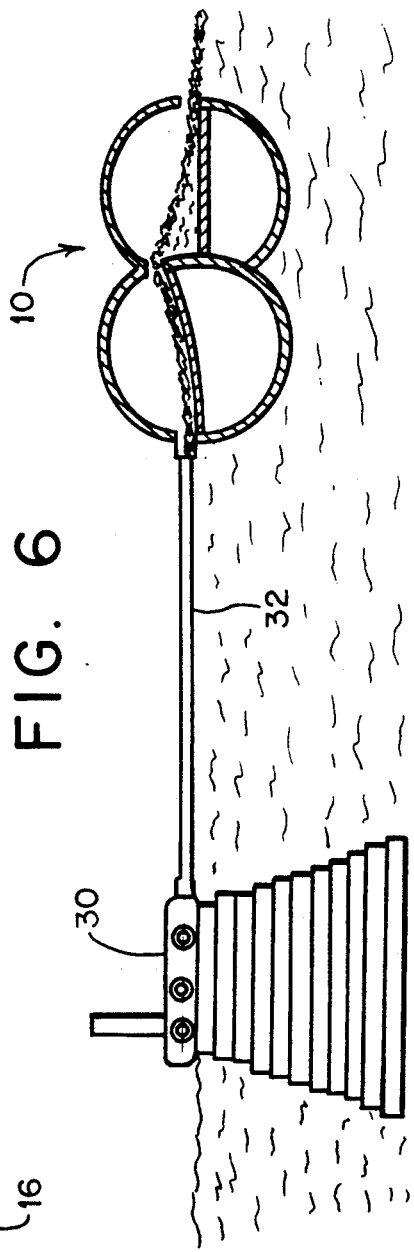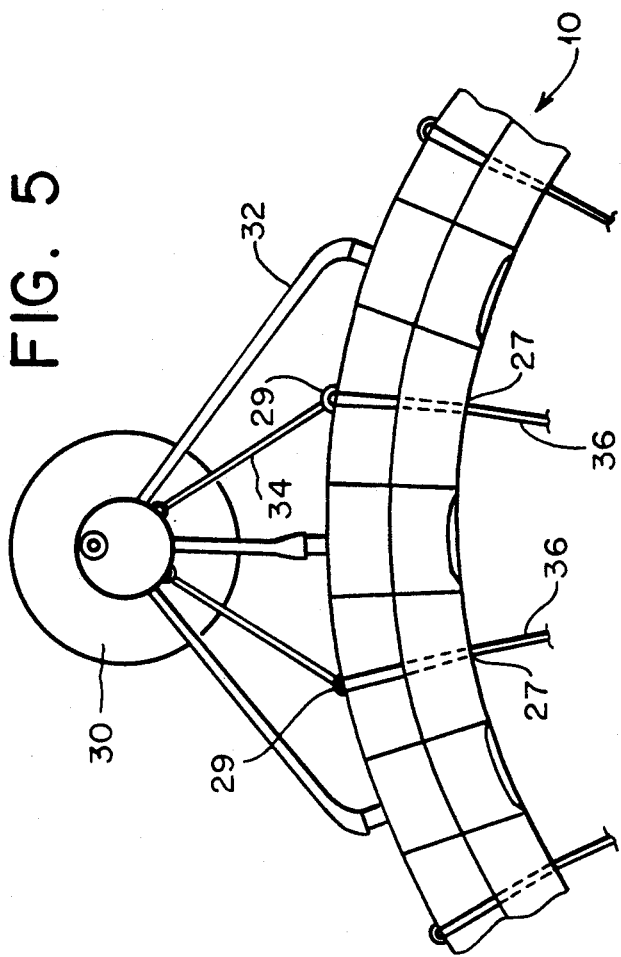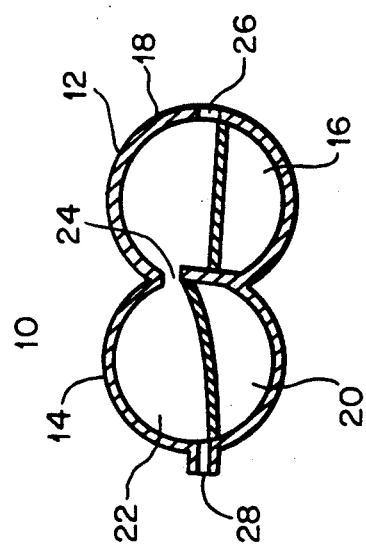

OIL CONTAINMENT BOOM AND SKIMMER

BACKGROUND OF THE INVENTION

1. Field of the Invention

The present invention relates to an oil containment boom and skimmer for containing and removing oil from water. More particularly, it relates to such a device having two chambers which are operatively connected together. The compartments have openings at different heights relative to the water level so that oil and water enter one side of the device, but only oil exits the device.

2. The Prior Art

When oil tankers develop leaks, oil containment booms are set up around the ship in order to prevent the oil from dispersing. Such a containment boom is shown in U.S. Pat. No. 5,000,616. Sections of the boom are connected together by coupling means. Unfortunately, the point at which these sections are connected together define gaps through which oil can escape. Furthermore, the boom does not provide any means for skimming the oil from the surface of the water.

U.S. Pat. No. 4,988,438 discloses an oil spill corral which contains and skims the oil. However, the corral must have the collected oil continuously pumped out of it in order to continue skimming. In other words, the corral does not possess means for storing the collected oil.

SUMMARY OF THE INVENTION

It is therefor an object of the present invention to eliminate the aforementioned drawbacks of the prior art, and to provide an oil containment boom and skimmer which effectively contains an oil spill.

It is a further object of the present invention to provide such a device which can store the collected oil.

It is yet a further object of the invention to provide a device which has a wave buffer so that the least amount of water enters the oil storage tank.

These and other related objects are attained according to the invention by an oil containment boom and skimmer having two cylindrical or tubular members which are operatively connected together. The first tubular member faces the oil spill area, and the second tubular member, which is connected to one side of the first tubular member, faces away from the oil spill area. Any number of oil containment boom and skimmer sections can be strung together to encircle the oil spill area.

The bottom half of the tubular members are sealed air pockets providing buoyancy to the members and thus the entire boom. The bottom half can also be continuous. The top half of each member forms an open space. The first member has a series of longitudinal/horizontal slots which face the oil spill area and are located approximately at sea level. The second member is connected to the first member so that their open spaces are in communication. The passageway from the first open area to the second open area is a continuous horizontal slot located a short distance above sea level. The second area is divided into separate compartments in the horizontal direction. The rear of these compartments is provided with a port which can be used to connect the skimmer to a separate oil storage tank.

The top layer of liquid enters the first compartment but does not automatically enter the second compartment, due to its higher opening. The resulting wave action will occasionally increase the water level within the first compartment, causing the top layer only to spill into the second compartment. The contents of the liquid spilling into the second compartment will therefore be primarily oil since oil is lighter than water and floats on it. Since the liquid in the second compartment has now been raised above sea level, its downward force can be channeled through the rear port, thus feeding the oil into the storage tank.

Any number of boom and skimmer sections can be connected together to contain the oil spill area. In addition, the boom and skimmer can be slowly propelled through an oil spill area to artificially create a force to lift oil up to the passageway and skim it off.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawings, wherein similar reference characters denote similar elements throughout the several views:

FIG. 4 is a cross-sectional view taken along the line 4—4 from FIG. 1;

FIG. 5 is a plan view of the oil containment boom and skimmer connected to an external storage tank; and FIG. 6 is a side-elevational view, in part cross-section, of the oil containment boom and skimmer with external storage tank.

DETAILED DESCRIPTION OF PREFERRED EMBODIMENTS

Figure 1:
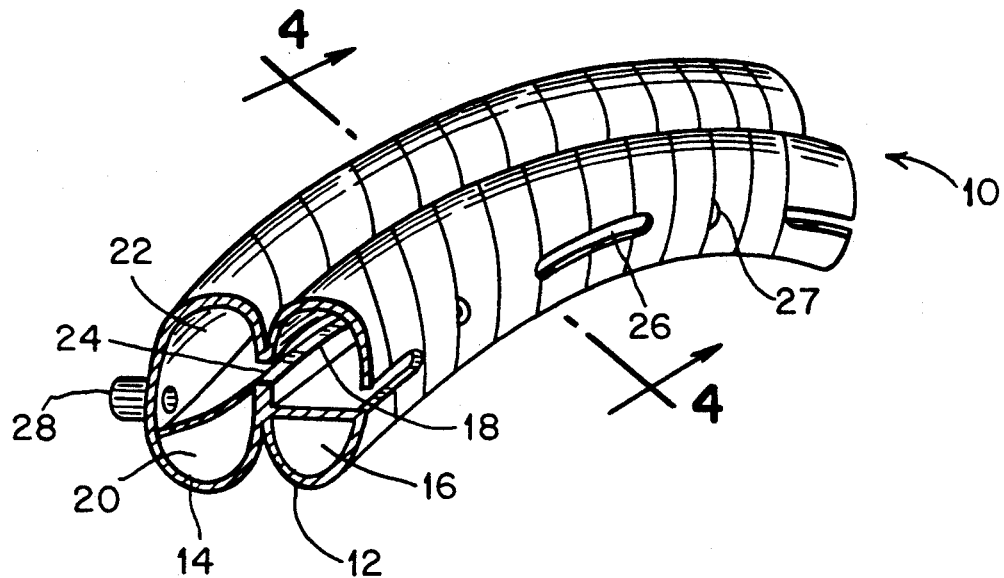
FIG. 1 is a perspective view of an oil containment boom and skimmer embodying the present invention.
Figure 2:
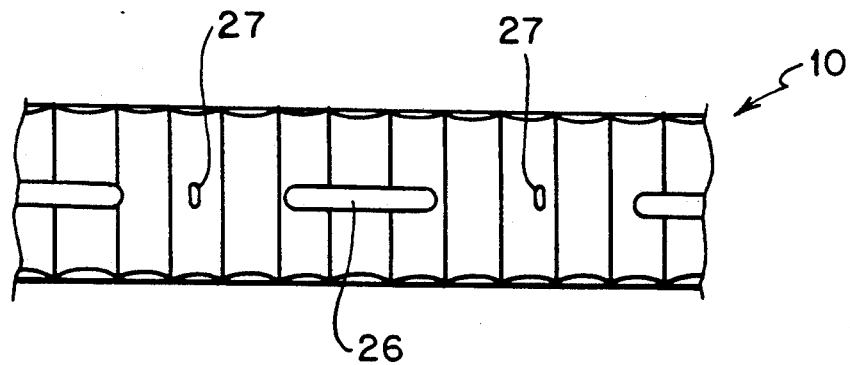
FIG. 2 is a front elevational view thereof.
Figure 3:
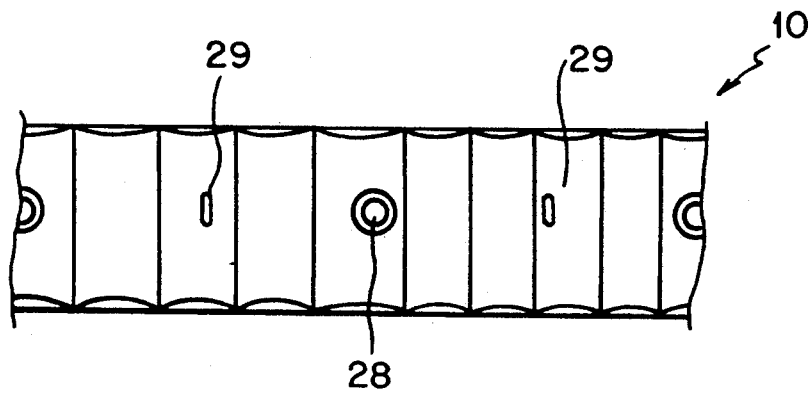
FIG. 3 is a rear elevational view thereof.

Turning now in detail to the drawings, and in particular, FIG. 1, there is shown a collapsible oil containment boom and skimmer 10 having a first tubular member 12 and a second tubular member 14. First tubular member 12 has a first lower sealed compartment 16 and a first open area 18. Second tubular member similarly possesses a second lower sealed compartment 20 and a second upper open area 22. The compartments can be continuous and sealed on the end with caps. First tubular member 12 and second tubular member 14 are joined together so that their open areas 18 and 22 are joined in the area of passageway 24. The front of first tubular member 12 is provided with a series of longitudinal slots 26 and towing rings 27 (see FIG. 2). The rear of second tubular member 14 is provided with ports 28 and dragging rings 29 (see FIG. 3).

Referring now to FIG. 4, oil containment boom and skimmer 10 is placed in the water with first tubular member 12 and longitudinal slot 26 facing the oil spill area. Oil containment boom and skimmer 10, for example, can be made of plastic, or molded plastic. Any number of sections can be joined together to completely encircle the oil spill area, regardless of its size. Second tubular member 14 and port 28 face away from the oil spill area. Longitudinal slot 26 is placed approximately at sea level so that the top layer of oil and water can enter into first upper open area 18. Sealed compartments 16 and 20 are filled with air and provide buoyancy to the device. The division of member 12 into open area 18 and sealed compartment 16, as well as the placement of longitudinal slot 26, determine how much liquid can enter open area 18. The oil and water mixture can enter first upper open area 18 either by normal wave action or by slowly dragging oil containment boom and skimmer 10 through the oil spill area by towing rings 27.

Passageway 24 is located slightly above sea level. The division of member 14 into open area 22 and sealed compartment 20, as well as the placement of passageway 24, determines how much liquid can enter open area 22. The oil and water mixture in first upper open area 18 will occasionally rise up to the level of passageway 24, permitting the top layer of oil to be skimmed off into second upper open area 22. The liquid in second upper open area 22 then drains through port 28 to an oil storage tank 30 (see FIGS. 5 and 6). Second upper open area 22 can be divided into sections to force the oil into port 28. Unused ports 28 can be capped.

As can be appreciated, oil containment boom and skimmer 10 selectively admits the upper layers of oil and water so that the liquid which is skimmed into oil storage tank 30 possesses a high concentration of oil. Thus, oil storage tank 30 is not needlessly filled with water. Since longitudinal slots 26 face the oil spill area, only a small amount of liquid can enter first open area 18. In this manner a first tubular member 12 acts as a wave buffer. When a wave encounters the oil containment boom and skimmer 10, it will splash against the side and not be admitted to the inner open areas 18, 22. Thus, only the top layers of liquid pass into the open areas 18, 22, resulting in a high concentration of oil passing to oil storage tank 30.

Port 28 can be connected to oil storage tank 30 through flexible pipes 32. Also, lines 34 can connect dragging rings 29 to oil storage tank 30 so that undue pressure is not exerted on flexible pipes 32. Also, towing cables 36 may be provided opposite lines 34 for the purpose of connecting towing rings 27 to a boat so that it can be slowly dragged through the oil spill area. As mentioned earlier, this motion or the natural wave motion allows a top layer of oil and water to enter first upper open area 18 and then rise up in order to spill through passageway 24.

As can be seen in FIG. 6, oil storage tank 30 may be collapsible and/or expandable. For example, it can have telescoping sections which open as additional volume is needed. It can also be made of a flexible material, e.g. rubber, which expands as filled. In this manner, its volume can conform to the volume of its liquid contents. Once oil has risen to enter passageway 24, for example, due to a wave, it is above sea level as it enters second upper open area 22. As a result, the force of gravity allows the oil to return to sea level, thus draining through port 28. Once the oil passes through flexible pipes 32 into oil storage area 30, there is no possibility of its spilling back out through oil containment boom and skimmer 10. Tank 30 can be equipped with flotation devices to keep it partially above water to facilitate pumping out of the oil, for example.

While only one embodiment of the present invention has been shown and described, it is to be understood that many changes and modifications may be made thereunto without departing from the spirit and scope of the invention as defined in the appended claims.

What is claimed is:

1. A flexible and collapsible passive oil containment boom and skimmer extending at least partially about, containing against further dispersion, and skimming an oil spill area from a contaminated body of water, comprising:
   a first longitudinally extending tubular member for placement adjacent to and facing the oil spill area, including a first inner open area for receiving oil and water and inlet means for admitting oil and water to said first inner open area, said inlet means extending longitudinally along said first longitudinally extending tubular member and facing the oil spill;
   a second longitudinally extending tubular member placed parallel to said first member and facing away from the oil spill area, and including a second inner open area in communication with said first inner open area;
   skimming means located between said members and at a greater elevation than said inlet means so as to skim oil from the oil and water in said first inner open area and deposit and confine it in said second inner open area; and
   flotation means for buoyancy located generally below said inlet means and said skimming means.

2. The invention according to claim 1, wherein said inlet means includes a plurality of longitudinally extending slots formed in said first member facing the oil spill area for admitting oil and water to said first open area.

3. The invention according to claim 2, wherein said flotation means provides buoyancy for maintaining the oil containment boom and skimmer at a predetermined level with respect to the water surface.

4. The invention according to claim 3, wherein said skimming means comprises a continuous longitudinally extending passageway with a lip which connects said first open area to said second open area.

5. A collapsible oil containment boom and skimmer including sealed compartments for buoyancy for extending at least partially about, containing against further dispersion, and skimming an oil spill area from a contaminated body of water, comprising:
   a first longitudinally extending tubular member for placement adjacent to the oil spill area, including a first inner open area for receiving oil and water and a first lower sealed compartment for providing buoyancy for maintaining the oil containment boom and skimmer at a predetermined level with respect to the water surface;
   inlet means for admitting oil and water to said first inner open area and including a plurality of longitudinally extending slots formed in said first member, facing the oil spill area for admitting oil and water to said first open area, said first sealed compartment located below said plurality of slots;
   a second longitudinally extending tubular member placed parallel to said first member and including a second inner open area in communication with said first inner open area and a second lower sealed compartment for providing buoyancy for maintaining the oil containment boom and skimmer at a predetermined level with respect to the water surface; and
   skimming means located between said members and at a greater elevation that said inlet means so as to skim oil from the oil and water in said first inner open area and deposit and confine it in said second inner open area, said skimming means formed by a continuous longitudinally extending passageway with a lip which connects to said first open area to said second open area, said second lower sealed compartment being located below said passageway.

6. The invention according to claim 5, said second member additionally including a port facing away from the oil spill area for draining the oil and water which is received in said second open area, said port located above said second sealed compartment.

7. The invention according to claim 6, additionally comprising a separate tank operatively connected to said port for storing the oil and water received in said second open area.

8. The invention according to claim 7, wherein said tank includes a third sealed area for providing buoyancy for maintaining at least part of the tank above water.

9. The invention according to claim 8, wherein said tank is a collapsible and expandable tank, its volume conforming to the volume of its liquid contents.

10. The invention according to claim 9, wherein said tubular members are made of molded plastic.

11. The invention according to claim 9, wherein said tubular members are made of plastic.

12. The invention according to claim 9, wherein said tank is made of plastic.

* * * * *